United States Patent
Rodriguez et al.

(10) Patent No.: US 7,482,763 B2
(45) Date of Patent: Jan. 27, 2009

(54) NON-PWM VEHICLE LAMP DIMMING ARRANGEMENT

(75) Inventors: Russell G Rodriguez, Auburn Hills, MI (US); Robert J Randel, West Bloomfield, MI (US); Robert G Rudzewicz, Troy, MI (US)

(73) Assignee: Chrysler LLC, Auburn Hills, MI (US)

( * ) Notice: Subject to any disclaimer, the term of this patent is extended or adjusted under 35 U.S.C. 154(b) by 552 days.

(21) Appl. No.: 11/343,785

(22) Filed: Jan. 31, 2006

(65) Prior Publication Data

US 2006/0170365 A1    Aug. 3, 2006

Related U.S. Application Data

(60) Provisional application No. 60/648,655, filed on Jan. 31, 2005.

(51) Int. Cl.
G05F 1/00    (2006.01)

(52) U.S. Cl. ............... 315/291; 315/224; 315/308; 315/158; 315/82; 362/372; 362/466

(58) Field of Classification Search ............ 315/77, 315/82, 149, 158, 291, 224, 226, 307, 308; 362/466, 475, 488, 372, 545; 345/102, 207
See application file for complete search history.

(56) References Cited

U.S. PATENT DOCUMENTS

| | | | | |
|---|---|---|---|---|
| 3,515,863 A | * | 6/1970 | Jungwirth | 362/490 |
| 6,762,741 B2 | * | 7/2004 | Weindorf | 345/102 |
| 7,202,613 B2 | * | 4/2007 | Morgan et al. | 315/312 |
| 2006/0146553 A1 | * | 7/2006 | Zeng et al. | 362/488 |

* cited by examiner

*Primary Examiner*—Haissa Philogene
(74) *Attorney, Agent, or Firm*—Ralph E. Smith

(57) ABSTRACT

This invention provides an arrangement for selectively varying the illumination level of an interior light source in a vehicle. The arrangement includes supplying a current to at least one interior light source to achieve a predetermined level of illumination, and reducing the level of illumination via a shunt arrangement in response to detection of a nighttime condition.

5 Claims, 2 Drawing Sheets

NON-PWM VEHICLE LAMP DIMMING ARRANGEMENT

CROSS-REFERENCE TO RELATED APPLICATION(S)

This application claims the benefit of U.S. Provisional Patent Application Ser. No. 60/648,655, filed Jan. 31, 2005.

FIELD OF THE INVENTION

The present invention relates to an arrangement for selectively varying the illumination intensity of an interior light of a vehicle.

BACKGROUND OF THE INVENTION

Generally, known arrangements for selectively varying the illumination intensity (i.e., dimming) a light in a vehicle utilize a pulse width modulated (PWM) output of a control module coupled (usually at 100%) as a power feed to the light. Such control modules typically produce the PWM signal by switching power applied to the light source ON and OFF very rapidly. By controlling the switching frequency supplied to the light, the average power supplied to the light can be controlled to allow adjustment of the level of illumination produced by the light.

While such arrangements work satisfactorily, due to minimal PWM I/O outputs of such controllers as well as the cost associated therewith, it is desirable to provide an arrangement for varying illumination of a light source in a vehicle that does not utilize pulse width modulation.

SUMMARY OF THE INVENTION

In accordance with the present invention, a method is provided for dimming an interior lighting system in a vehicle. The method includes supplying a current to at least one interior light source to achieve a predetermined level of illumination viewable in a daytime condition. The level of illumination is reduced whenever existence of a nighttime condition is detected. The current supplied to the at least one interior light source is reduced using a shunt circuit whenever the nighttime condition is detected. The at least one interior light source produces a reduced level of illumination suitable for viewing under the nighttime condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
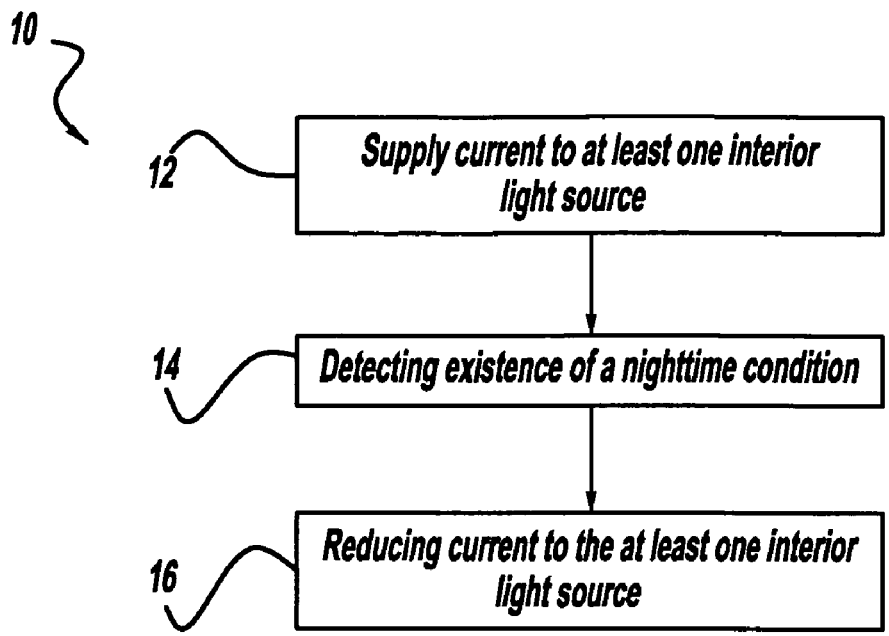
FIG. 1 is a flow chart of a method for selectively varying, (such as dimming) an interior lighting system of a vehicle.

FIG. 1 provides a flowchart illustrating an arrangement 10 in accordance with the present invention for selectively controlling the level of lamination of an interior lighting system of a vehicle. More specifically, as shown at step 12, a predetermined amount of electrical current is supplied to at least one interior light source to cause the light source to produce a predetermined level of illumination tailored for viewing in a daytime condition at step 14. In accordance with one aspect of the present invention, the level of illumination can be reduced when existence of a nighttime condition is detected at step 16, such as by selectively reducing the current supplied to the at least one light source via a shunt circuit whenever the nighttime condition is detected at step 18. Due to a reduced current, the at least one interior light source produces a reduced level of illumination tailored for viewing under the nighttime condition.

Figure 2:
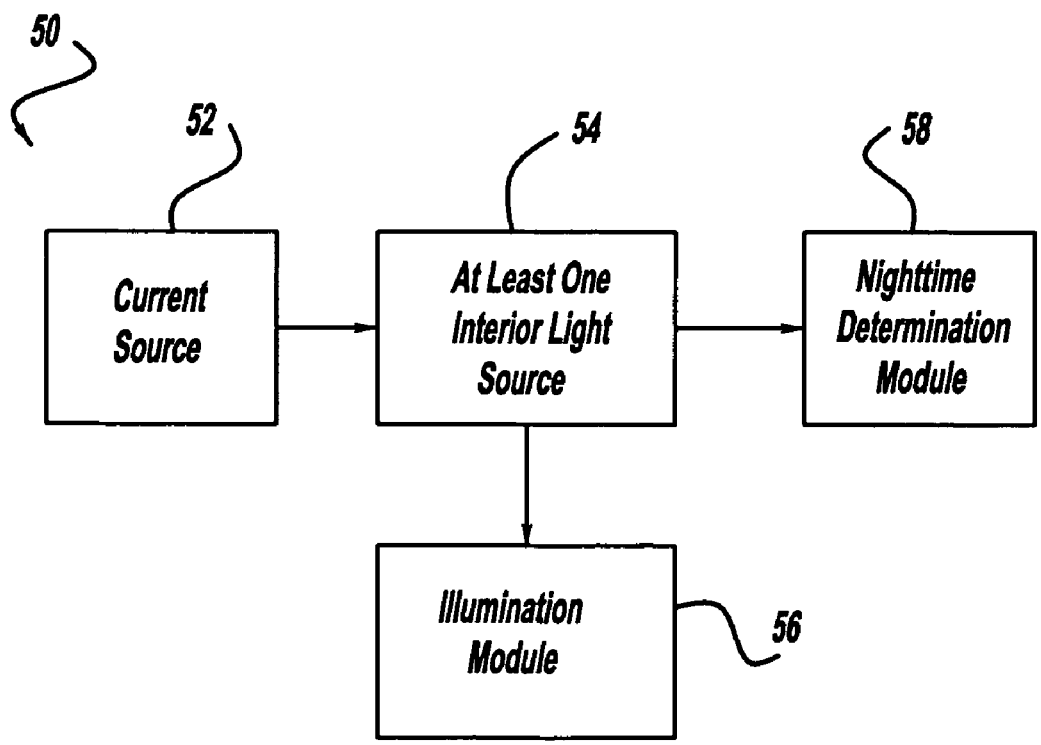
FIG. 2 is a block diagram of an exemplary system used to implement the method for dimming the interior lighting system of the vehicle.

FIG. 2 provides an exemplary block diagram of a system 50 for selectively controlling the illumination of the interior lighting system of the vehicle in accordance with the present invention. The system 50 includes a current source 52, at least one interior light source 54, an illumination module 56 and a nighttime determination module 58. The current source 52 is coupled to the at least one interior light source 54, such as a light emitting diode (LED) or an interior light bulb in a display panel, an operation panel or a backup lighting indicator (e.g. passenger airbag indicator). The at least one interior light source 54 is coupled to the illumination module 56. Additionally, the at least one interior light source 54 is coupled to the nighttime determination module 58. It will be understood that while the term "module" is used in this description, such term includes devices such as an application specific integrated circuit (ASIC), an electronic circuit, a processor (shared, dedicated, or group) and memory that executes one or more software or firmware programs, a combinational logic circuit, and/or other suitable components that provide the described functionality.

The at least one interior light source 54 produces a predetermined level of illumination tailored for viewing during a daytime condition. For example, the daytime condition can be denoted when exterior lights of the vehicle, normally deactivated during daytime, are deactivated. In the exemplary embodiment, current source 52 supplies a predetermined amount of current to the at least one interior light source 54. However, the at least one interior light source 54 is normally in an "OFF" state until the illumination module 56 receives an indication to turn "ON" the at least one interior light source 54. The indication received by the illumination module 56 depends on which type of interior light source is used in the interior lighting system. For example, if the operator of the vehicle turned on a HVAC or rear defroster switch that contained a lighting indicator when activated, then the illumination module 56 turns "ON" the at least one interior light source 54 after the switch is placed in an "ON" state. If the at least one interior light source 54 is a backup light indicator, then the illumination module 56 turns "ON" the at least one interior light source 54 after an illumination message is received from the vehicle. Once the at least one interior light source 54 is turned "ON," the at least one interior light source produces a predetermined level of illumination viewable during the daytime condition.

Upon detecting existence of a nighttime condition, the nighttime determination module 58 reduces the current applied to the at least one interior light source 54. For example, nighttime determination module 58 monitors whether at least one exterior light source 52 is activated, such as a headlamp or a parking lamp, wherein activation of the at least one exterior light source 52 is indicative of the nighttime condition.

Figure 3:
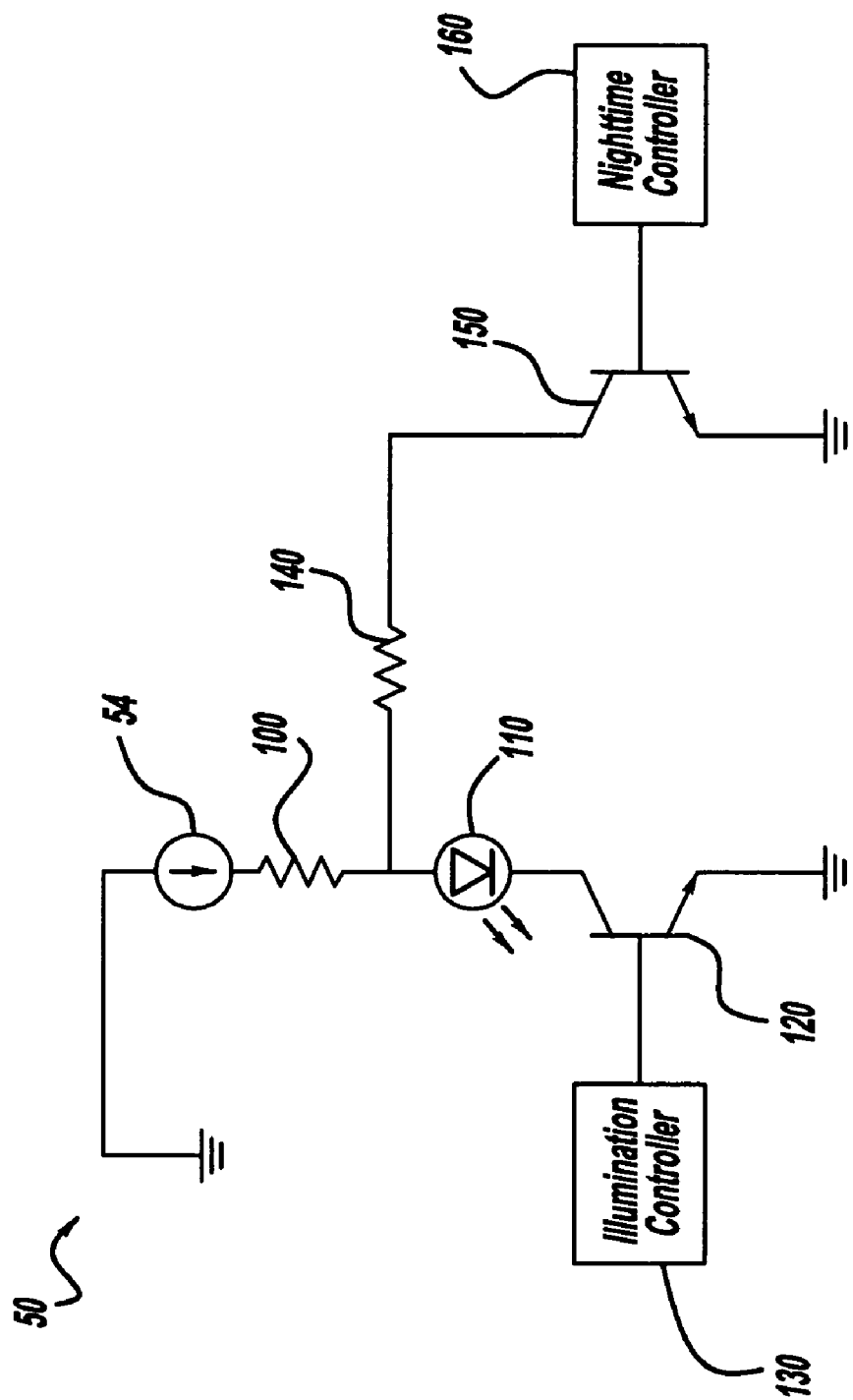
FIG. 3 is a detailed schematic of an exemplary circuit in accordance with the present invention.

FIG. 3 is an exemplary circuit schematic in accordance with the present invention. As shown, current source 54 is coupled to one side of a first resistor 100. The other side of resistor 100 is coupled to an anode terminal of a LED 110. The cathode terminal of the LED 110 is coupled to a collector of a first transistor 120, while the base of transistor 120 is coupled to an illumination controller 130. The emitter of transistor 120 is coupled to ground. Additionally, one side of a second resistor 140 is coupled to the other side of the first resistor 100 such that a current dividing circuit is created. The other side of the second resistor 140 is coupled to the collector of a second transistor 150 such that an activation of the second transistor 150 creates a shunt circuit. The base of the second transistor 150 is coupled to a nighttime determination controller 160. The emitter of the second transistor 150 is coupled to ground. Each transistor is placed in a normally "OFF" state until the transistor is activated.

In operation, the current source 52 supplies current to the LED 110. When the illumination controller 130 receives an indication from the vehicle to illuminate the LED 110, the illumination controller 130 activates the first transistor 120. The indication received by the illumination controller 130 depends on which type of interior light source is used in the interior lighting system. For example, the illumination controller 130 may activate the first transistor 120 after an operator of the vehicle turns "ON" a switch that contains a lighting indicator. Additionally, the illumination controller 130 may activate the first transistor 120 when a serial data message is received from the vehicle. Once the first transistor 120 is activated, the LED 110 produces the predetermined level of illumination.

When the nighttime condition is detected, the nighttime determination controller 160 activates the second transistor 150. For example, the nighttime determination controller triggers the second transistor 150 after an exterior light source, normally operated at night by an operator of the vehicle, is activated. Once the second transistor 150 is activated, the shunt circuit draws a predetermined amount of current through the second resistor 140 and the second transistor 150; hence, the current supplied to the LED 110 is reduced. With a reduced amount of current supplied to the LED 110, the LED 110 is dimmed to a lower level of illumination tailored for nighttime viewing.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for selectively controlling a level of illumination for an interior light in a vehicle, the method comprising:
   supplying a current to at least one interior light source to produce a predetermined level of illumination;
   detecting existence of a nighttime condition; and
   reducing the current to the at least one interior light source using a shunt circuit whenever the nighttime condition is detected to produce a reduced level of illumination.

2. The method of claim 1 wherein detecting a nighttime condition further comprises monitoring for activation of an exterior vehicle light source.

3. A system for selectively varying an illumination level of an interior light of a vehicle, the system comprising:
   a current source;
   at least one interior light source coupled to the current source and receiving a current supplied by the current source to produce a predetermined level of illumination; and
   a nighttime determination controller coupled to the at least one interior light source and arranged to detect existence of a nighttime condition, where the nighttime determination controller reduces the current supplied to the at least one interior light source using a shunt circuit whenever the nighttime condition is detected to produce a reduced level of illumination.

4. The system of claim 3 wherein the nighttime determination controller is arranged to detect activation of an exterior vehicle light source.

5. The system of claim 3 further comprising:
   an illumination module coupled to the at least one interior light source, where the illumination module cycles the current supplied to the at least one interior light source from OFF to ON after an illumination indication is received from the vehicle.

* * * * *